(12) United States Patent
Wheelock

(10) Patent No.: US 10,310,138 B2
(45) Date of Patent: Jun. 4, 2019

(54) ACCELERATED OCCAM INVERSION USING MODEL REMAPPING AND JACOBIAN MATRIX DECOMPOSITION

(71) Applicant: Brent D. Wheelock, Houston, TX (US)

(72) Inventor: Brent D. Wheelock, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 291 days.

(21) Appl. No.: 15/239,174

(22) Filed: Aug. 17, 2016

(65) Prior Publication Data

US 2017/0075030 A1    Mar. 16, 2017

Related U.S. Application Data

(60) Provisional application No. 62/218,756, filed on Sep. 15, 2015.

(51) Int. Cl.
*G06F 17/50* (2006.01)
*G01V 99/00* (2009.01)
(Continued)

(52) U.S. Cl.
CPC .............. *G01V 99/005* (2013.01); *G01V 3/38* (2013.01); *G01V 11/00* (2013.01); *G06F 17/16* (2013.01); *G01V 2210/61* (2013.01)

(58) Field of Classification Search
CPC ......... G01V 99/005; G01V 11/00; G01V 3/38
(Continued)

(56) References Cited

U.S. PATENT DOCUMENTS

2010/0018719 A1   1/2010  Lu et al.
2013/0194893 A1*  8/2013  Nagarajappa .......... G01V 1/364
                                                        367/43

OTHER PUBLICATIONS

Dimri, V.P. et al. (2003) "An efficient and accurate algorithm for non-linear inversion of geoelectric data following Occam's inversion scheme" 2003 SEG Conference Paper, Oct. 26-31, Dallas, Texas. pp. 1-3.

(Continued)

*Primary Examiner* — Dwin M Craig
(74) *Attorney, Agent, or Firm* — ExxonMobil Upstream Research Company-Law Department

(57) ABSTRACT

A method including: generating an updated subsurface property model of a subsurface region, with a computer, from an initial estimate of the subsurface property model by performing an iterative inversion, which includes inverting geophysical data to infer the updated subsurface property model, wherein the generating the updated subsurface property model includes linearly remapping the initial estimate of the subsurface property model based on an inverse of a regularization operator, included with the initial estimate of the subsurface property model, into one in which the regularization operator is represented by an identity matrix, performing a unitary matrix decomposition in order to group the identity matrix with sparse matrices output from the unitary matrix decomposition, and performing a search over at least one trade-off parameter to reduce a misfit between simulated data generated from a most recent estimate of the subsurface property model and the geophysical data until a predetermined stopping criteria is satisfied; and generating, with a computer, an image of the subsurface region using the updated subsurface property model.

19 Claims, 2 Drawing Sheets

(51) Int. Cl.
*G06F 17/16* (2006.01)
*G01V 3/38* (2006.01)
*G01V 11/00* (2006.01)

(58) Field of Classification Search
USPC .......................................................... 703/10
See application file for complete search history.

(56) References Cited

OTHER PUBLICATIONS

Siripunvaraporn, W. et al., (2000) "An efficient data-subspace inversion method for 2-D magnetotelluric data", Geophysics, Society of Exploration Geophysicists, vol. 65, No. 3, pp. 791-803.
Abubakar, A., et al. (2011). Joint MT and CSEM data inversion using a multiplicative cost function approach. *Geophysics*, 76(3), F203-F214.
Abubakar, A., et al. (2012). A model-compression scheme for nonlinear electromagnetic inversions. *Geophysics*, 77(5), E379-E389.
Avdeev, D. B. (2005). Three-dimensional electromagnetic modelling and inversion from theory to application. *Surveys in Geophysics*, 26(6), 767-799.
Commer, M. et al. (2009). Three-dimensional controlled-source electromagnetic and magnetotelluric joint inversion. *Geophysical Journal International*, 178(3), 1305-1316.
Constable, S. C., et al. (1987). Occam's inversion: A practical algorithm for generating smooth models from electromagnetic sounding data. *Geophysics*, 52(3), 289-300.
Egbert, G. D. (2012). Hybrid conjugate gradient-Occam algorithms for inversion of multifrequency and multitransmitter EM data. *Geophysical Journal International*, 190(1), 255-266.
Hu, W., et al. (2011). Preconditioned non-linear conjugate gradient method for frequency domain full-waveform seismic inversion. *Geophysical Prospecting*, 59(3), 477-491.
Liberty, E., et al. (2007). Randomized algorithms for the low-rank approximation of matrices. *Proceedings of the National Academy of Sciences*, 104(51), 20167-20172.
Meqbel, N., et al.(Jun. 2014). New advances for a joint 3D inversion of multiple EM methods. In 76th EAGE Conference and Exhibition-Workshops.
Newman, G. A., et al. (2000). Three-dimensional magnetotelluric inversion using non-linear conjugate gradients. Geophysical journal international, 140(2), 410-424.

* cited by examiner

ACCELERATED OCCAM INVERSION USING MODEL REMAPPING AND JACOBIAN MATRIX DECOMPOSITION

CROSS-REFERENCE TO RELATED APPLICATION

This application claims the benefit of U.S. Provisional Patent Application 62/218,756 filed Sep. 15, 2015 entitled ACCELERATED OCCAM INVERSION USING MODEL REMAPPING AND JACOBIAN MATRIX DECOMPOSITION, the entirety of which is incorporated by reference herein.

FIELD OF THE INVENTION

Exemplary embodiments described herein pertain to geophysical prospecting. More specifically, exemplary embodiments described herein pertain to inversion of electromagnetic field data using Occam's inversion.

BACKGROUND

This section is intended to introduce various aspects of the art, which may be associated with exemplary embodiments of the present technological advancement. This discussion is believed to assist in providing a framework to facilitate a better understanding of particular aspects of the technological advancement. Accordingly, it should be understood that this section should be read in this light, and not necessarily as admissions of prior art.

Controlled-source electromagnetic ("CSEM") geophysical surveys use man-made sources to generate electromagnetic fields to excite the earth, and deploy receiver instruments on the earth's surface, on the seafloor, in the air, or inside boreholes to measure the resulting electric and magnetic fields, i.e., the earth's response to the source excitation. By way of example, a vessel can tow a submerged CSEM transmitter over an area of the seafloor. The electric and magnetic fields measured by receivers are then analyzed to determine the electrical resistivity of the earth structures beneath the seafloor.

Magnetotelluric ("MT") geophysical surveys exploit naturally occurring variations in the earth's electromagnetic fields. Receivers are deployed on the earth's surface, on the seafloor, in the air, or inside boreholes to measure the vector components of either the electric field, or the magnetic field, or both over a length in time of this natural variation. Transfer functions between the measured fields are estimated which are then analyzed to determine electrical resistivity of the earth structure beneath the plane of measurement.

One manifestation of mathematical inversion is the process by which observations, or data, are converted into estimates of a model of interest. For example, in geophysics these observations may be electric and magnetic field measurements at the earth's surface, and the model of interest is the distribution of electrical resistivity within the subsurface. The physical process which connects electrical resistivity, the model, to the electromagnetic fields, the data, is represented by a non-linear set of equations. As such, the inversion algorithm used must be chosen from a family of non-linear optimizations. Two of the non-linear optimization styles, most commonly used in geophysics are Non-linear Conjugate Gradient (NLCG), a first-order approach, and Gauss-Newton, a second-order approach (e.g., Newman & Alumbaugh, 2000; D. Avdeev, 2005; Hu et al., 2011; Egbert, 2012). In short, the NLCG method is far less onerous computationally than Gauss-Newton, but is less adept at resolving finer features of a model than a second-order approach, like Gauss-Newton.

It is fair to say that independent of computational cost, between the two aforementioned approaches, the Gauss-Newton method is always preferred, but because of its high cost, it is seldom used for large problems like 3D inversion.

Occam's inversion algorithm was first introduced by Constable et al. (1987) to find the smoothest model that fits some MT or geo-electric sounding data. Occam's inversion is a process that matches the measured electromagnetic data to a theoretical model of many layers of finite thickness and varying resistivity. Details of conventional Occam inversion are found in Constable et al., and are only discussed herein as may be necessary for those of ordinary skill in the art to understanding the present technological advancement.

For small-scale problems, Occam's inversion is widely used in underdetermined non-linear inversion, like that encountered in electromagnetic geophysics. It is a regularized Gauss-Newton method which progresses iteratively over a series of models which tend to produce lower misfit than their predecessor. Within the iteration, a search is made for the optimal model update by varying trade-offs between the minimizing data misfit and minimizing model structure (often called regularization). Such a trade-off is set by a Lagrange parameter, $\lambda$. Each step in the search requires a large matrix inversion to find a prospective model update, which is used to find the corresponding misfit achieved by the current Lagrange parameter value. Often this "line" search requires the testing of 5-10 different Lagrange parameter values before a suitable reduction in misfit is achieved. The size of the linear system matrix, and therefore the duration for computing its inverse, is a function of the number of model parameters. As geophysical problems become more complicated, i.e. 2D or 3D inversion, the number of these model parameters can become very large, and therefore the Lagrange parameter line search, requiring multiple large matrix inversions, can be debilitating slow.

SUMMARY

A method including: generating an updated subsurface property model of a subsurface region, with a computer, from an initial estimate of the subsurface property model by performing an iterative inversion, which includes inverting geophysical data to infer the updated subsurface property model, wherein the generating the updated subsurface property model includes linearly remapping the initial estimate of the subsurface property model based on an inverse of a regularization operator, included with the initial estimate of the subsurface property model, into one in which the regularization operator is represented by an identity matrix, performing a unitary matrix decomposition in order to group the identity matrix with sparse matrices output from the unitary matrix decomposition, and performing a search over at least one trade-off parameter to reduce a misfit between simulated data generated from a most recent estimate of the subsurface property model and the geophysical data until a predetermined stopping criteria is satisfied; and generating, with a computer, an image of the subsurface region using the updated subsurface property model.

In the method, the unitary matrix decomposition represents fully, or approximately, a matrix product of a Jacobian matrix.

In the method, the unitary matrix decomposition is SVD.

In the method, the unitary matrix decomposition is randomized SVD.

In the method, the unitary matrix decomposition is bidiagonalization.

In the method, the generating includes computing the SVD once for each iteration of the iterative inversion, and performing the search using the computed SVD and one or more trade-off parameters to reduce the misfit.

In the method, the generating includes computing the randomized SVD once for each iteration of the iterative inversion, and performing the search using the computed SVD and one or more trade-off parameters to reduce the misfit In the method, the generating includes computing the SVD once for each iteration of the iterative inversion, and performing a search using the computed SVD and one or more trade-off parameters to determine a smoothest solution which fits the geophysical data and satisfies a predetermined target misfit relative to the geophysical data.

In the method, the generating includes computing the randomized SVD once for each iteration of the iterative inversion, and performing a search using the computed SVD and one or more trade-off parameters to determine a smoothest solution which fits the geophysical data and satisfies a predetermined target misfit relative to the geophysical data.

The method can further comprise using at least one of the updated subsurface property model or the image of the subsurface region to manage hydrocarbon exploration.

The method can further comprise drilling a well at a location determined from at least one of the updated subsurface property model or the image of the subsurface region.

The method can further comprise exploring for hydrocarbons using at least one of the updated subsurface property model or the image of the subsurface region.

The method can further comprise performing a survey that acquires geophysical data.

In the method, the iterative inversion is a joint inversion of two or more of electromagnetic data, magnetotelluric data, gravity data, or seismic data.

In the method, the geophysical data is either controlled source electromagnetic data, seismic data, gravity data, or magnetotelluric data.

In the method, the iterative inversion is a joint inversion.

In the method, the joint inversion includes two or more geophysical data sets.

In the method, the joint inversion includes at least two trade off parameters used to adjust a relative weighting in generating the updated subsurface property model.

In the method, the sparse matrices are diagonal eigenvalue matrices when the unitary matrix decomposition is SVD or randomized SVD.

In the method, the sparse matrices are bidiagonal matrices when the unitary matrix decomposition is bidiagonalization.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Figure 1:
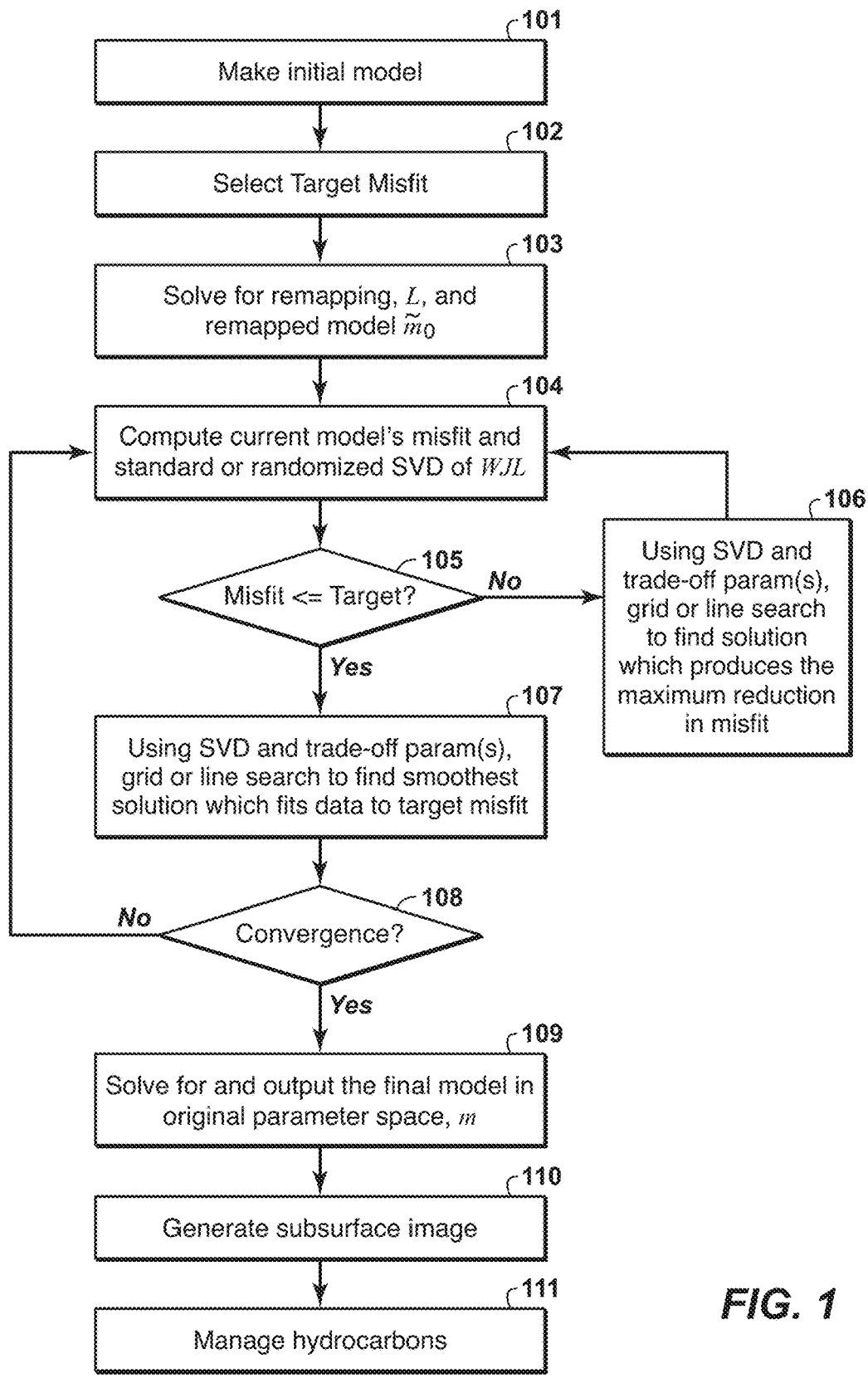
FIG. 1 illustrates an exemplary embodiment of the present technological advancement.

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Overview

The present technological advancement is a reformulation of the Gauss-Newton method which makes it accessible with modern computational resources. The present technological advancement is based on a specific version of the Gauss-Newton approach, Occam's inversion (Constable et al., 1987), which is known for its stability and robustness with respect to the starting model, but again, has hitherto been too expensive to use for large-scale problems.

As a means to speed up the Occam inversion algorithm for the purpose of large models, the present technological advancement utilizes only one matrix factorization per iteration (similar in cost to a single matrix inversion), regardless of the number of trade-offs tested, i.e. steps taken in the line search for the Lagrange parameter. Each Lagrange parameter trial amounts to a few matrix multiplications, only two of which are non-sparse, after the initial matrix factorization is performed. The present technological advancement utilizes the a priori linear re-mapping of the model domain into one in which the regularization operator, or model penalty, can be represented by the identity matrix. Once that mapping is found, the regularized Gauss-Newton system is solved using a singular value decomposition (SVD).

Furthermore, the present technological advancement can address a challenge posed by the joint inversion of disparate data types (e.g. CSEM & MT, MT & Gravity, or CSEM & Seismic). Often with disparate data types, either solving for the same model, or two separate subsurface property models coupled by regularization, the difficulty comes in finding the proper relative weighting each data type should have in guiding an inversion. Too much weight on one type of data may cause the inversion to founder in a local minimum of the misfit functional; too little weight on that same data type may sacrifice resolution in the final model. Most conventional methods require choosing the weighting, either a priori, by using the relative number of data, or during inversion, by taking some measure of each data type's misfit gradient (e.g., Commer & Newman, 2009; Abubakar et al. 2011; Meqbel & Ritter, 2014). One aspect of the present technological advancement is to let the weighting itself be another Lagrange parameter, to be chosen adaptively within each iteration of an inversion, such that the chosen weighting produces the minimum achievable misfit for both data types. This problem can be posed using the usual Occam approach except now there are two Lagrange parameters ($\lambda$ and $\mu$) to scan in search of a minimum in misfit. A dual-parameter search, a "grid search", would be too onerous if at every grid point a full Gauss-Newton derived matrix inversion was needed. In this embodiment of the present technological advancement, a mathematical simplification, again using SVD and remapping, is utilized to reduce the work required at each grid point to a series of matrix multiplications and one inverse of a highly compressed matrix system relative to that of the full Gauss-Newton system. Again, only one SVD for each data type is needed during each iteration of the inversion, within which the grid search takes place.

Inversion of Geophysical Data

FIG. 1 is a flow chart of a new implementation of an Occam inversion process. In step 101, an initial model is developed. This initial model may be a guess, which may or may not be based on available information regarding the relevant subsurface region. The Occam inversion process is iterative, and the initial model will be iteratively updated until the process converges to a final model based on an acceptance criteria. Such an acceptance criteria can be established in step 102, in which a target misfit between a model and measured data is selected. The goodness of the fit of model predictions to actual values (measured data) is commonly performed with a weighted least-squares approach, as is well known to those of ordinary skill in the art.

In step 103, the model domain is remapped into one in which the regularization operator (or model penalty) is represented by the identity matrix. The present technological advancement utilizes a conversion of model space, such that the inversion acts on a fictitious set of parameters that are different from those one wishes to solve for.

As used herein, a fictitious parameter is the parameter that results from a transformation of the model domain into a domain where the regularization operator is represented by the identity matrix. It is referred to as "fictitious" as the parameter in the transformed domain is not a true representation of a subsurface parameter. As used herein, subsurface parameter includes geophysical properties such as p-wave velocity, shear-wave velocity, anisotropic parameters, attenuation parameters, porosity, permeability, density, and resistivity. This is not an exhaustive list of parameters useable with the present technological advancement.

The particular conversion is completely determined by the type of regularization chosen for the inversion. The linear re-mapping, or conversion operator, is represented as the matrix L, and the original regularization operator as matrix R. Matrix R is often a first-difference "roughness" estimator, but could take any other form subject to a few constraints described later. Then, I=RL is defined, where I is the identity matrix. In other words, the model re-mapping is the inverse of the regularization operator. The re-mapped model parameter, $\tilde{m}$, is related to the original by m=L$\tilde{m}$, or vice versa, $\tilde{m}$=Rm.

Borrowing notation from the seminal Occam paper by Constable et al. (1987), and writing down the original Gauss-Newton linear system to be solved in the $k^{th}$ iteration, for a given Lagrange parameter, $\lambda_j$, we have $$m_{jk} = [(WJ_k)^T(WJ_k) + \lambda_j R^T R]^{-1}(WJ_k)^T W\hat{d}_k. \quad (1)$$

Then it can easily be shown that the equivalent solution in the re-mapped parameter space is $$\tilde{m}_{jk} = [(WJ_kL)^T(WJ_kL) + \lambda_j I]^{-1}(WJ_kL)^T W\hat{d}_k. \quad (2)$$

Now a SVD is applied, such that $WJ_kL = U\Sigma V^T$. Then, with the k subscripts omitted for tidiness, we can show the classical simplification of equation (2)

$$\tilde{m}_j = V(\Sigma^T\Sigma + \lambda_j I)^{-1}\Sigma^T U^T W\hat{d}. \quad (3)$$

SVD (singular value decomposition) provides a convenient way for breaking or "decomposing" a matrix, which perhaps contains the linearized behavior of the physical system we are interested in, into simpler, meaningful pieces. While SVD is discussed in this example, it is not the only available technique for matrix decomposition and others are described below. Suppose $WJ_kL$ is a m×n matrix whose entries come from the field D, which is either the field of real numbers or the field of complex numbers. Then there exists a factorization, called a singular value decomposition of $WJ_kL$, of the form $WJ_kL = U\Sigma V^T$, where $\Sigma$ is a m×n diagonal matrix with non-negative real numbers (e.g., eigen value matrix) on the diagonal, and U is an m×m, and $V^T$ is an n×n, unitary matrices over D. (If D=R, unitary matrices are orthogonal matrices.) $V^T$ is the conjugate transpose of the n×n unitary matrix, V.

The diagonal entries, $\sigma_i$, of $\Sigma$ are known as the singular values of $WJ_kL$. A common convention is to list the singular values in descending order. In this case, the diagonal matrix, $\Sigma$, is uniquely determined by $WJ_kL$.

In step 104, the current model's misfit with the measured data and a SVD of WJL are calculated. Calculation of the misfit can be done using a weighted least-squares criterion, which is discussed in Constable et al. (1987). However, other methods of calculating misfit can be used with the present technological advancement.

Note that in this simplified form, the SVD need only be performed once per iteration, or per k as the Jacobian matrix, $J_k$, changes for each loop. At each new $\lambda_j$ in (3), only the inverse of a diagonal matrix ($\Sigma^T\Sigma + \lambda_j I$) is needed, which is trivial to compute, and the remaining operations are matrix multiplications, which are far less taxing than the inverse of a full matrix (compare with the inverse term in equation (1) which requires computation of the inverse of a full matrix for each Lagrange parameter value).

In step 105, the misfit calculated in step 104 is compared to the target misfit (or another predetermined stopping criteria) selected in step 102.

If the misfit is not less than or equal to the target, then the process proceeds to step 106. In step 106, a line search for $\lambda_j$ is performed to find a value for $\lambda_j$ that minimizes the misfit. The SVD calculated in step 104 and tradeoff (Lagrange) parameters are used to find a solution that produces the maximum reduction in misfit.

Steps 104, 105, and 106 are repeated until the misfit is less than or equal to the target or another predetermined stopping criteria is satisfied.

The process proceeds to step 107 once the misfit is less than or equal to the target or another predetermined stopping criteria is satisfied. In step 107, if the misfit is less than the target, a line search is performed using the SVD calculated in step 104 and trade-off (Lagrange) parameters to find the model with the least model penalty which still fits the measured data to the target misfit. Often the smoothest model is sought here, where the regularization operator, or model penalty, takes the form of a spatial derivative. Step 107 can be bypassed, as in no final smoothing is performed before model output. At the end of step 106, if there is a model that fits the data, smoothing after that is preferred to remove unnecessary model structure that may be misleading in regards to the subsurface. However, once there is a model that fits the data to the target misfit, no smoothing is required, but it is recommended. The Occam namesake implies that we seek the simplest model which fits the data, not just any model.

In step 108, the solution can be checked for convergence. If the solution does not converge, the process can return to step 104. Otherwise, the process can output a final model for $\tilde{m}$.

Once an inversion for $\tilde{m}$ has run its course, converging after multiple iterations (step 108), the final model in the original parameter space is recovered by $m=L\tilde{m}$ in step 109.

Figure 2:
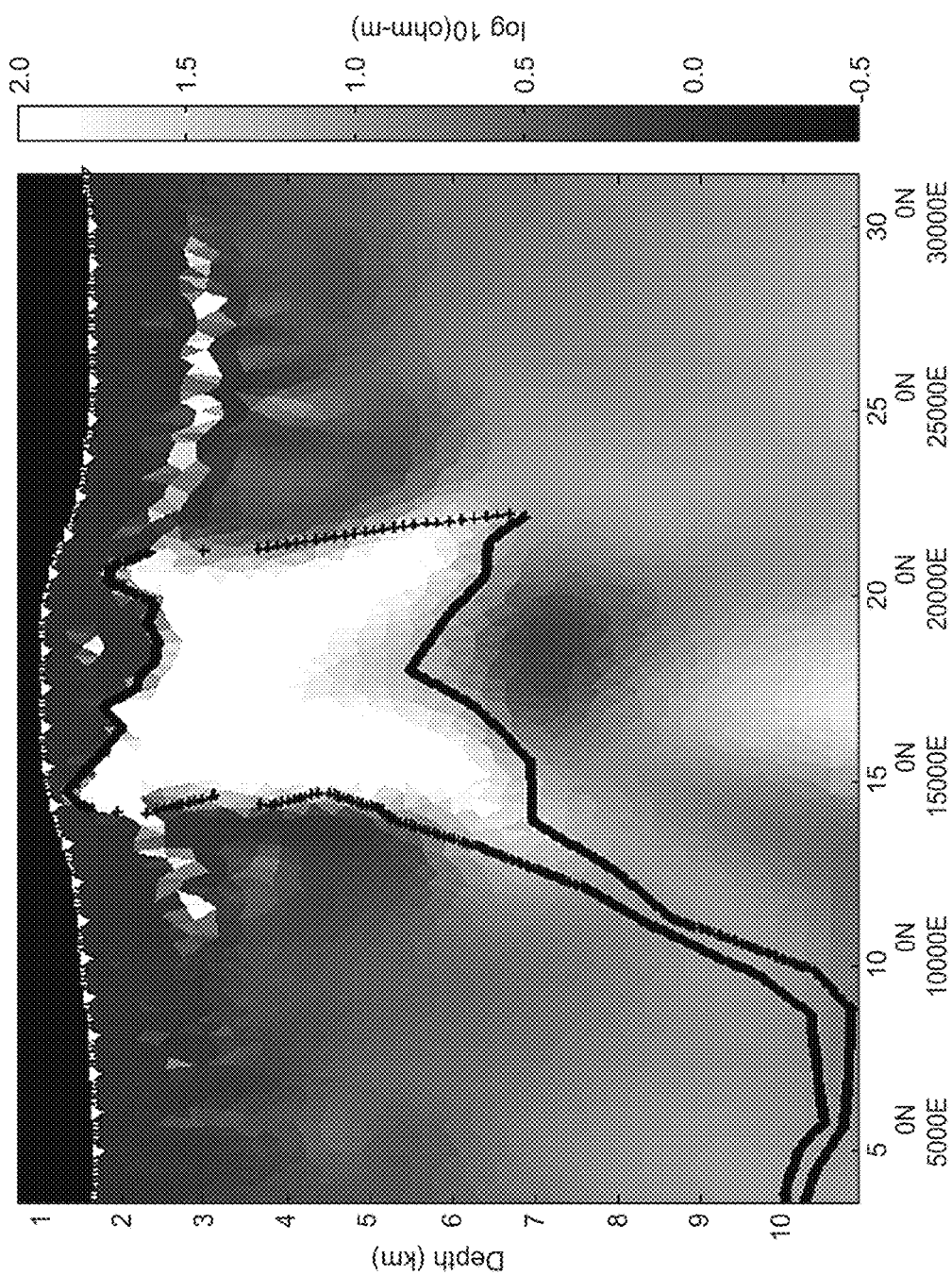
FIG. 2 illustrates an exemplary subsurface image achievable with the present technological advancement.

In step 110, a subsurface image can be generated from the final model in the original sub-surface parameter space. This may be done by plotting the values in m in their proper position in space. FIG. 2 illustrates an example of a subsurface image based on resistivity as a function of sub-surface position.

In step 111, hydrocarbons are managed according to the output subsurface model and/or the subsurface image. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

The acceleration of the line-search in the present technological advancement via re-mapping hinges upon the ability to find the inverse of the chosen regularization operator a priori. In other words, $\det(R) \neq 0$. Theoretically, this means that penalty cuts cannot be used, which would result in zeroes along the diagonal of R; similarly, every model parameter must be penalized to result in an R that is square. In practice, this requirement is easily satisfied by multiplying penalties that one wishes to eliminate, making a cut in the regularization, by some small, but non-zero value. The inverse of the penalty operator can still be found while the penalty cut, in a practical sense, is still applied.

Joint Inversion of Multiple Data Types

The exemplary embodiment above described using one Lagrange parameter. However, multiple Lagrange parameters can be used with the present technological advancement. The dual Lagrange parameter and joint inversion (multiple data types; such as two or more of electromagnetic, MT, seismic or gravity) requires a few more manipulations relative to what is described above. The Gauss-Newton linear system for a single iteration of a joint inversion, in the remapped model space, is as follows:

$$\tilde{m}=[(W_1J_1L)^T(W_1J_1L)+\mu(W_2J_2L)^T(W_2J_2L)+\lambda I]^{-1}$$
$$[(W_1J_1L)^T W_1\hat{d}_1+\mu(W_2J_2L)^T W_2\hat{d}_2]. \quad (4)$$

For the readability of equation (4) and those that follow, subscripts related to the iteration and the trial Lagrange parameter have been omitted, leaving only those related to the two data types. With joint inversion, the SVD is applied twice, once for each type of data, such that $W_1J_1L=U_1\Sigma_1V_1^T$ and $W_2J_2L=U_2\Sigma_2V_2^T$, which again allows the simplification of the above equation (4) to:

$$\tilde{m}=[V_1(\Sigma_1^T\Sigma_1+\lambda I)V_1^T+\mu V_2\Sigma_2^T\Sigma_2V_2^T]^{-1}$$
$$[V_1\Sigma_1^T U_1^T W_1\hat{d}_1-\mu V_2\Sigma_2^T U_2^T W_2\hat{d}_2]. \quad (5)$$

To solve the matrix inversion on the right-hand side of equation (5), the following Woodbury Matrix Identity can be used:

$$(A+USV^T)^{-1}=A^{-1}-A^{-1}U(S^{-1}+V^TA^{-1}U)^{-1}V^TA^{-1}. \quad (6)$$

If what's known as the "correction matrix", the term $USV^T$ in equation (6), is low rank, such that U is M-by-K, S is K-by-K, and V is M-by-K, with K<<M, then the inversion of the sum of A and the correction matrix requires only the inverse of A. In the present case, the inverse of A is trivial to compute, and the inverse of the K-by-K matrix (the $(S^{-1}+V^TA^{-1}U)^{-1}$ portion of equation (6)), is a much smaller task than the inverse of the full system. Recall that M is the number of free parameters in the model while K is the rank of the second data type's Jacobian, which is assumed to be relative low. Applied to the Gauss-Newton joint inversion we have $$\tilde{m}_k=V_1(\Sigma_1^T\Sigma_1+\lambda I)^{-1}[I-V_1^T V_2\{\mu^{-1}(\Sigma_2^T\Sigma_2)^{-1}+V_2^T V_1$$
$$(\Sigma_1^T\Sigma_1+\lambda I)^{-1}V_1^T V_2\}^{-1}V_2^T V_1(\Sigma_1^T\Sigma_1+\lambda I)^{-1}]$$
$$[\Sigma_1^T U_1^T W_1\hat{d}_1+\mu V_1^T V_2\Sigma_2^T U_2^T W_2\hat{d}_2], \quad (7)$$

where again, the $\{\mu^{-1}(\Sigma_2^T\Sigma_2)^{-1}+V_2^T V_1(\Sigma_1^T\Sigma_1+\lambda I)^{-1}V_1^T V_2\}^{-1}$ constitutes a relatively small K-by-K matrix inversion. The simplifications in (7) greatly speeds up the grid search for problems of large M, as a full M-by-M matrix need never be inverted as would be the case with a standard Occam or Gauss-Newton inversion. Of course, at every grid point, a forward calculation is still required on the model update to test its resulting reduction in misfit.

For joint-inversion of more than two data sets, say three for example, it is easy to expand (4) to $$\tilde{m}=[(W_1J_1L)^T(W_1J_1L)+\mu(W_2J_2L)^T(W_2J_2L)+\kappa(W_3J_3L)^T$$
$$(W_3J_3L)+\lambda I]^{-1}[(W_1J_1L)^T W_1\hat{d}_1+$$
$$\mu(W_2J_2L)^T W_2\hat{d}_2+\kappa(W_3J_3L)^T W_3\hat{d}_3]. \quad (8)$$

Then we would again apply SVDs to each of the three data type's Jacobians and use the Woodbury Matrix Identity. However, instead we would set A in equation (6) to $$A=\mu V_2[\Sigma_2^T\Sigma_2+\kappa V_2^T V_3\Sigma_3^T\Sigma_3V_3^T V_2]V_2^T, \quad (9)$$

whose inverse constitutes at most the inverse of a K-by-K full matrix (the matrix within the brackets in (9)), where K is the rank of $J_2$. Then, for the remainder of equation (6) we would set $$USV^T=V_1(\Sigma_1^T\Sigma_1+\lambda I)V_1^T. \quad (10)$$

The result for three or more data types is very similar to equation (7) where at most, for each new value of the three Lagrange parameters, say $\lambda$, $\mu$, and $\kappa$, only a K-by-K full matrix inversion is needed, which is a much smaller task than the straightforward inverse in equation (8). The minimization of data misfit (for all data types) over all the Lagrange parameters can be performed in many ways. The preferred embodiment would use a CG approach to solve for the optimal Lagrange parameters, say, $\lambda$, $\mu$, and $\kappa$, which achieve the greatest reduction in misfit for the current model, $m_k$. The misfit gradient with respect to the Lagrange parameters, a necessary input to NLCG, can immediately be assembled from the pre-existing unitary matrix decompositions of each data type's Jacobian. Due to the unitary nature of these components, the computation of the gradient in misfit with respect to Lagrange parameters requires only matrix multiplication.

Randomized SVD and Bidiagonalization

Above, the standard SVD was discussed. Equally, other unitary matrix decompositions like bidiagonalization may be substituted. The consequence of using a bidiagonalizing decomposition would be that the analogue to our $\Sigma$ would be upper-bidiagonal. This results in tridiagonal matrices which need to be inverted for each Lagrange parameter, still a feasible task, but since the SVD requires the inverse of only a diagonal matrix, it is given preference in the preceding description.

An embodiment of the present technological advancement could use the standard SVD on fully calculated and stored Jacobian matrices. However, in a preferred embodiment, which makes use of the ability to approximate the low rank matrices, such as WJL feeding into (3), or $W_1J_1L$ and $W_2J_2L$ feeding into (7), with a truncated SVD. A well-known algorithm called randomized SVD (Liberty et al., 2007) can be used to produce the approximate, or compressed, factorization under the prior choice of K. This idea of compression is similar to that proposed by Abubakar et al., 2012, except that the truncated basis set is not predetermined, but derived anew within each iteration from the evolving model sensitivity, an advantage bestowed by the SVD of the Jacobian. In practice, K is not exactly known ahead of time, nor is it easy to define numerically on a perfectly known system, but it can be hypothesized by the degrees of freedom apparent in the data. Yet K does not need to be known exactly. With a hypothesized K that is larger than the true K, yet much smaller than the number of free parameters, M, it is safe to proceed, and the designated compression will still yield acceleration of the Gauss-Newton method. The factorization rank, K need not remain fixed throughout the inversion either. It may start out low, even lower than the true K, in early iterations where fine-scale model features are not needed to reduce misfit, and progressively increase from one iteration to the next as the inversion model approaches one which produces the target misfit. Another aspect of the randomized SVD algorithm is that it never requires the full explicit calculation or storage of any of the Jacobian matrices. In fact, only the action of a matrix, J and $J^T$ in our case, on an arbitrary vector is needed. This is equivalent in effort to the gradient calculation already made in many of the current codes. The source vector for such calculations, consisting of normalized data residuals when the misfit gradient is desired, would simply be replaced with a random vector, hence the name randomized-SVD.

Computer Hardware

In all practical applications, the present technological advancement must be used in conjunction with a computer, programmed in accordance with the disclosures herein. Preferably, in order to efficiently perform inversion, the computer is a high performance computer (HPC), as it is known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

References

The following references are hereby incorporated by reference in their entirety:

Abubakar, A., Li, M., Pan, G., Liu, J., & Habashy, T. M. (2011). Joint MT and CSEM data inversion using a multiplicative cost function approach. Geophysics, 76(3), F203-F214;

Abubakar, A., Habashy, T. M., Lin, Y., & Li, M. (2012). A model-compression scheme for nonlinear electromagnetic inversions. Geophysics, 77(5), E379-E389;

Avdeev, D. B. (2005). Three-dimensional electromagnetic modelling and inversion from theory to application. Surveys in Geophysics, 26(6), 767-799;

Commer, M., & Newman, G. A. (2009). Three-dimensional controlled-source electromagnetic and magnetotelluric joint inversion. Geophysical Journal International, 178 (3), 1305-1316;

Constable, S. C., Parker, R. L., & Constable, C. G. (1987). Occam's inversion: A practical algorithm for generating smooth models from electromagnetic sounding data. Geophysics, 52(3), 289-300;

Egbert, G. D. (2012). Hybrid conjugate gradient-Occam algorithms for inversion of multifrequency and multitransmitter EM data. Geophysical Journal International, 190(1), 255-266.

Hu, W., Abubakar, A., Habashy, T. M., & Liu, J. (2011). Preconditioned non-linear conjugate gradient method for frequency domain full-waveform seismic inversion. Geophysical Prospecting, 59(3), 477-491;

Liberty, E., Woolfe, F., Martinsson, P. G., Rokhlin, V., & Tygert, M. (2007). Randomized algorithms for the low-rank approximation of matrices. Proceedings of the National Academy of Sciences, 104(51), 20167-20172; and Meqbel, N., & Ritter, O. (2014, June). New advances for a joint 3D inversion of multiple EM methods. In 76th EAGE Conference and Exhibition-Workshops.

Newman, G. A., & Alumbaugh, D. L. (2000). Three-dimensional magnetotelluric inversion using non-linear conjugate gradients. Geophysical journal international, 140(2), 410-424.

What is claimed is:

1. A method comprising:
    generating an updated subsurface property model of a subsurface region, with a computer, from an initial estimate of the subsurface property model by performing an iterative inversion, which includes inverting geophysical data to infer the updated subsurface property model,
    wherein the generating the updated subsurface property model includes linearly remapping the initial estimate of the subsurface property model based on an inverse of a regularization operator, included with the initial estimate of the subsurface property model, into one in which the regularization operator is represented by an identity matrix,
    performing a unitary matrix decomposition in order to group the identity matrix with sparse matrices output from the unitary matrix decomposition, and
    performing a search over at least one trade-off parameter to reduce a misfit between simulated data generated from a most recent estimate of the subsurface property model and the geophysical data until a predetermined stopping criteria is satisfied;
    generating, with a computer, an image of the subsurface region using the updated subsurface property model; and
    using at least one of the updated subsurface property model or the image of the subsurface region to manage hydrocarbon exploration.

2. The method of claim 1, wherein the unitary matrix decomposition represents fully, or approximately, a matrix product of a Jacobian matrix.

3. The method of claim 1, wherein the unitary matrix decomposition is Single Value Decomposition (SVD).

4. The method of claim 1, wherein the unitary matrix decomposition is randomized SVD.

5. The method of claim 1, wherein the unitary matrix decomposition is bidiagonalization.

6. The method of claim 3, wherein the generating includes computing the SVD once for each iteration of the iterative inversion, and performing the search using the computed SVD and one or more trade-off parameters to reduce the misfit.

7. The method of claim 4, wherein the generating includes computing the randomized SVD once for each iteration of the iterative inversion, and performing the search using the computed SVD and one or more trade-off parameters to reduce the misfit.

8. The method of claim 3, wherein the generating includes computing the SVD once for each iteration of the iterative inversion, and performing a search using the computed SVD and one or more trade-off parameters to determine a smoothest solution which fits the geophysical data and satisfies a predetermined target misfit relative to the geophysical data.

9. The method of claim 4, wherein the generating includes computing the randomized SVD once for each iteration of the iterative inversion, and performing a search using the computed SVD and one or more trade-off parameters to determine a smoothest solution which fits the geophysical data and satisfies a predetermined target misfit relative to the geophysical data.

10. The method of claim 1, wherein managing hydrocarbon exploration comprises drilling a well at a location determined from at least one of the updated subsurface property model or the image of the subsurface region.

11. The method of claim 1, wherein managing hydrocarbon exploration comprises exploring for hydrocarbons using at least one of the updated subsurface property model or the image of the subsurface region.

12. The method of claim 1, wherein managing hydrocarbon exploration comprises performing a survey that acquires geophysical data.

13. The method of claim 1, wherein the iterative inversion is a joint inversion of two or more of electromagnetic data, magnetotelluric data, gravity data, or seismic data.

14. The method of claim 1, wherein the geophysical data is either controlled source electromagnetic data, seismic data, gravity data, or magnetotelluric data.

15. The method of claim 1, wherein the iterative inversion is a joint inversion.

16. The method of claim 15, wherein the joint inversion includes two or more geophysical data sets.

17. The method of claim 15, wherein the joint inversion includes at least two trade off parameters used to adjust a relative weighting in generating the updated subsurface property model.

18. The method of claim 1, wherein the sparse matrices are diagonal eigenvalue matrices when the unitary matrix decomposition is SVD or randomized SVD.

19. The method of claim 1, wherein the sparse matrices are bidiagonal matrices when the unitary matrix decomposition is bidiagonalization.

* * * * *